United States Patent

[11] 3,602,270

[72] Inventors Billy T. Disher;
  Robert R. Swanson, both of Winston-Salem, N.C.
[21] Appl. No. 863,169
[22] Filed Oct. 2, 1969
[45] Patented Aug. 31, 1971
[73] Assignee Western Electric Company, Incorporated
  New York, N.Y.

[54] APPARATUS FOR REMOVING FLASH AND STRAIGHTENING LEADS ON MOLDED COMPONENTS
  5 Claims, 3 Drawing Figs.
[52] U.S. Cl. .................................................. 140/147,
  15/93 R
[51] Int. Cl. .................................................. B21f 1/02
[50] Field of Search .......................................... 140/139,
  140, 147; 15/93 R

[56] References Cited
UNITED STATES PATENTS

| 3,146,805 | 9/1964 | Bryner et al. ................. | 140/147 |
| 3,168,755 | 2/1965 | Miller ........................... | 15/93 |
| 3,186,447 | 6/1965 | Wilson et al. ................. | 140/147 |

Primary Examiner—Granville Y. Custer, Jr.
Attorneys—W. M. Kain, R. P. Miller and B. I. Levine ABSTRACT: A conventional lead straightener is modified to remove flash from electrical components in addition to straightening leads. The rubber rollers and shoes between which the leads of a component are rolled in the conventional lead straightener are modified by the addition of metal inserts which crush the flash from the lead. The metal inserts are positioned at an angle to the rollers such that the leads maintain contact with rubber when engaged by the metal inserts.

INVENTORS
B. T. DISHER
R. R. SWANSON

BY D. W. Marks
ATTORNEY

APPARATUS FOR REMOVING FLASH AND STRAIGHTENING LEADS ON MOLDED COMPONENTS

BACKGROUND OF THE INVENTION

1. Field of the Invention

Electrical components having axial leads are encapsulated in insulative plastic material by a conventional molding apparatus. The molding apparatus often produces flash, or excess material along the leads adjacent to the body of the component. Additionally, gate stubs may be left on the component bodies after they have been severed from the hardened runners. This excess plastic material must be removed or it will interfere with automatic component insertion apparatus which later assembles the individual components into a printed circuit board. The flash material breaks off when the leads are bent by the automatic component insertion apparatus causing jamming and interfering with the operation of the insertion apparatus.

2. Description of the Prior Art

It has been necessary in the prior art to manually strip the excess flash from the leads of the components. This is a costly and time-consuming job.

Summary of the Invention

An object of the invention is an apparatus for stripping the excess plastic material from axial leading components.

In accordance with this and other objects, an embodiment of the invention incorporates a rubber surfaced drum cooperating with a rubber surfaced shoe for rolling a lead of a component therebetween. Metal inserts in the rubber surfaced shoe and in the rubber surfaced drum crush the excess plastic material from the leads. The metal inserts in the rubber surfaced drum and rubber surfaced shoe are positioned at an angle to the axis of the drum such that the leads maintain contact with the rubber surface at all times.

Detailed Description

Figures 1, 2:
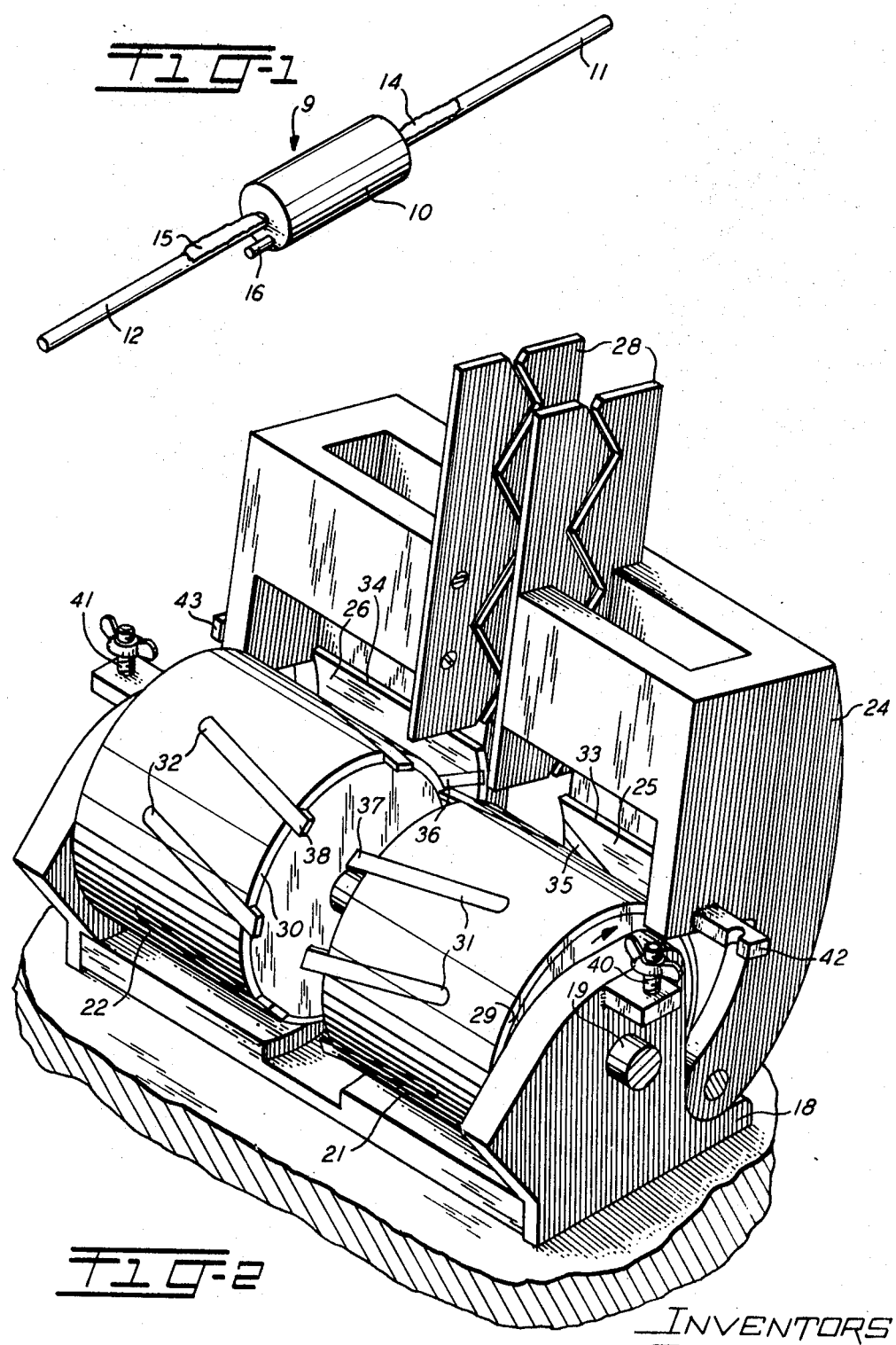
FIG. 1 is an isometric projection of a component having axial leads in which excess plastic material is formed.
FIG. 2 is an isometric projection of an apparatus embodying the principles of the invention.

Referring first to FIG. 1, there is shown an electrical component 9 having a body 10 with leads 11 and 12 projecting axially therefrom. The electrical component may be a resistor, a capacitor or other device having the body portion 10 formed by encapsulating the electrical element in an insulative plastic material, such as glass filled thermosetting epoxy. The encapsulation is performed by a molding process in commercial molding apparatus, for example a conventional transfer molding apparatus. In the molding process, flash is often times produced along the leads 11 and 12, for example flash 14 is shown projecting along the lead 11 and flash 15 is shown extending along the lead 12. In addition, a gate stub 16 extending from the body 10 which is produced by the hardening of the plastic material in the entrance opening to the molding cavity of the mold. The gate stub may be left when the hardened runner is severed from the component.

Referring now to FIG. 2, there is shown an apparatus for straightening the leads 11 and 12 of the component and for removing the flash 14 and 15 from the leads 11 and 12 along with the gate stub 16. The apparatus has a base 18 in which a shaft 19 is rotatably mounted with two drums 21 and 22 secured on the shaft 19. Suitable power facilities (not shown) are provided for rotating the shaft 19 and drums 21 and 22 in a clockwise direction, as shown in FIG. 2. The drums 21 and 22 are metal wheels with layers of a resilient material, such as rubber, 29 and 30 formed respectively thereon.

A casting 24 is mounted on the base 18 and has two removable shoes 25 and 26 secured therein with inside diameters slightly larger than the diameters of the drums 21 and 22. The shoes 25 and 26 are metal with respective layers of resilient material, such as rubber, 33 and 34 formed thereon. In a conventional lead straightening machine, the casting 24 is rigidly mounted on the base 18 such that the shoes 25 and 26 mate with the respective drums 21 and 22 to roll the leads of components between the mating rubber surfaces. Suitable mechanism (not shown) may be provided for adjusting the clearance between the shoes 25 and 26 and the drums 21 and 22 to accommodate different size components.

The mounting of the casting 24 of the embodiment shown in FIG. 2 differs from the mounting of castings in conventional machines in that the casting 24 is pivotally mounted on the base 18 so that it may be quickly opened by an operator to clear components which have become jammed between the drums 21 and 22 and the shoes 25 and 26. When closed, the casting 24 is secured to the base 18 by a pair of eye bolts 40 and 41 pivotally mounted on the base 18. The eye bolts 40 and 41 are inserted in slots in respective projections 42 and 43 which are secured by wing nuts.

The drums 21 and 22 differ from conventional lead straightening drums in that the drums 21 and 22 have a plurality of metal inserts or ribs 31 and 32, respectively, spaced around the surfaces of the drums. Also, the shoes 25 and 26 differ from conventional lead straightening shoes in that the shoes 25 and 26 have respective metal inserts or ribs 35 and 36 extending through the surfaces of the rubber layers 33 and 34. The inserts 31, 32, 35 and 36 may be bonded to the underlying metal of the respective drums 21 and 22 and shoes 25 and 26, or the inserts may be bonded into recesses in the respective rubber layers 29, 30, 33 and 34 with a thin layer of rubber separating the inserts from the underlying metal.

The inserts 31, 32, 35 and 36 on the respective drums 21 and 22 and shoes 25 and 26 crush the excess plastic material formed on the leads of the components. The metal inserts 31 and 32 on the drums 21 and 22 and the metal inserts 35 and 36 on the shoes 25 and 26 are elongated and formed at an angle to the axis of the drums 21 and 22 such that the respective leads being rolled between the drum 21 and shoe 25 and the drum 22 and shoe 26 are always engaged by the rubber surfaces.

In addition, the metal inserts 31 and 32 on the drums 21 and 22 are provided with projections 37 and 38 which engage gate stubs on the bodies of the components to break them off. The casting 24 has a guide 28 for directing the leads of the components to the opening between the drums 21 and 22 and shoes 25 and 26.

A conventional lead straightening machine may be easily modified to produce an apparatus in accordance with the invention. The drums 21 and 22 and shoes 25 and 26 are removed from the conventional machine. A plurality of spaced slots are milled through the rubber layers 29 and 30 into the underlying metal of the drums 21 and 22 at an angle to the axis of the drums and in the desired positions for the plurality of metal inserts 31 and 32. Metal bars are then inserted and bonded into the slots formed in the drums 21 and 22. The drums 21 and 22 are then turned in a lathe until the metal bars are flush or slightly depressed with the rubber surface to produce the inserts 31 and 32. Similarly, slots are milled in the shoes 25 and 26 in the desired position for the inserts 35 and 36. Metal bars are bonded into the slots and ground down to be flush or slightly depressed with the rubber surfaces of the shoes 25 and 26. The drums 21 and 22 and shoes 25 and 26 are then reassembled into the machine and the spacing between the drums 21 and 22 and shoes 25 and 26 adjusted to both straighten leads on components and crush the excess plastic material on the leads.

Figure 3:
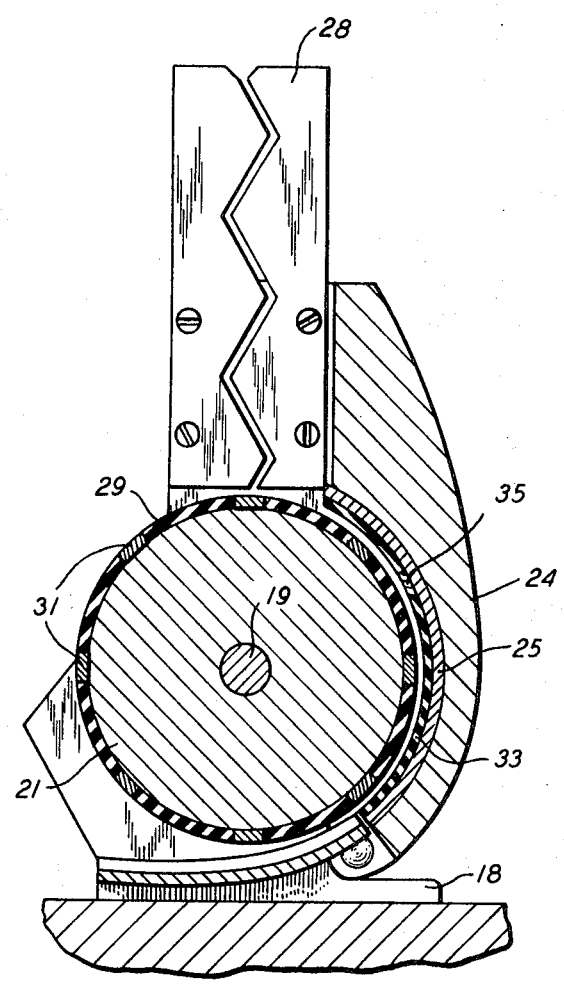
FIG. 3 is a side view of the apparatus shown in FIG. 2 showing the apparatus in its normal closed position.

In operation, the casting 24 is pivoted to the closed position shown in FIG. 3 and secured by the bolts 40 and 41. The shaft 19 and drums 21 and 22 are rotated clockwise. The component 9 is inserted into the guide 28 where it falls by gravity such that the lead 11 is rolled between the drum 21 and shoe 25 and simultaneously the lead 12 is rolled between the drum 22 and shoe 26. The flash 14 is crushed and broken from the lead 11 by metal inserts 31 and 35 while the flash 15 is crushed and broken from the lead 12 by metal inserts 32 and 36. The gate stub 16 is engaged by one of the projections 38 to break the stub 16 from the body 10. The leads 11 and 12 are straightened by rolling between the drums 21 and 22 and shoes 25 and 26. The component 9 falls from the bottom of the lead straightener along with the broken excess plastic material.

What we claim is:

1. An apparatus for removing flash from a lead comprising:
a rotatable drum having a resilient layer thereon;
a shoe having a resilient layer thereon for cooperating with the drum to roll the lead therebetween;
a rigid rib on the drum exposed through the surface of the resilient layer on the drum; and
a rigid rib on the shoe exposed through the surface of the resilient layer on the shoe for cooperating with the rigid rib on the drum to crush the flash from the lead.

2. An apparatus as defined in claim 1, wherein:
the rib on the drum and the rib on the shoe are elongated and at an angle to the axis of the drum such that the lead is always engaged by the resilient layers while being rolled between the drum and shoe.

3. An apparatus for removing excess plastic material and straightening the leads of an axial component, comprising:
a rotatable shaft;
a pair of equal diameter drums mounted on the shaft and having resilient surfaces formed thereon;
a pair of arcuate shoes having resilient surfaces thereon and each shoe mounted for cooperating with a respective drum to roll a respective lead therebetween;
a plurality of metal ribs spaced on the surfaces of each drum; and
a metal rib on each shoe for cooperating with the metal ribs on the respective drum to break the excess plastic material from a respective lead.

4. An apparatus as defined in claim 3, wherein:
the ribs on the drums and the ribs on the shoes are formed at an angle to the axis of the drum.

5. An apparatus as defined in claim 4, wherein:
the metal ribs on the shoes extend into the space between the drums to break extending plastic portions from the bodies of the components.